(12) United States Patent
Lee et al.

(10) Patent No.: US 9,560,385 B2
(45) Date of Patent: *Jan. 31, 2017

(54) METHOD AND APPARATUS FOR ENCODING/DECODING IMAGE

(71) Applicant: KT CORPORATION, Kyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT Corporation, Kyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,981

(22) Filed: Jan. 26, 2015

(65) Prior Publication Data

US 2015/0139306 A1    May 21, 2015

Related U.S. Application Data

(63) Continuation of application No. 14/353,288, filed as application No. PCT/KR2012/008482 on Oct. 17, 2012.

(30) Foreign Application Priority Data

Oct. 17, 2011 (KR) .................. 10-2011-0106107

(51) Int. Cl.
*H04N 19/102* (2014.01)
*H04N 19/91* (2014.01)
(Continued)

(52) U.S. Cl.
CPC ............. *H04N 19/91* (2014.11); *H04N 19/11* (2014.11); *H04N 19/12* (2014.11); *H04N 19/122* (2014.11);
(Continued)

(58) Field of Classification Search
CPC ...... H04N 19/122; H04N 19/61; H04N 19/12; H04N 19/176; H04N 19/46; H04N 19/186; H04N 19/11; H04N 19/00781; H04N 19/159; H04N 19/60; H04N 19/147; H04N 19/136; H04N 19/00018; H04N 19/103; H04N 19/132; H04N 19/70; H04N 19/00775; H04N 19/593; H04N 19/129; H04N 19/157; H04N 19/91; H04N 19/13; H04N 19/14; H04N 19/00763; H04N 19/436; H04N 19/463; H04N 19/625; H04N 19/88; H04N 19/00278; H04N 19/124; H04N 19/127; H04N 19/44; H04N 19/467; H04N 19/00078; H04N 19/00139; H04N 19/00545; H04N 19/119; H04N 19/154; H04N 19/156; H04N 19/18; H04N 19/196; H04N 19/645; H04N 19/96; H04N 19/00084; H04N 19/00109; H04N 19/00218; H04N 19/00424; H04N 19/00533; H04N 19/00569; H04N 19/00684; H04N 19/00951; H04N 19/105; H04N 19/109; H04N 19/152; H04N 19/184; H04N 19/187; H04N 19/194; H04N 19/30; H04N 19/51; H04N 19/513; H04N 7/30
(Continued)

(56) References Cited

U.S. PATENT DOCUMENTS 7,092,576 B2    8/2006    Srinivasan et al.
7,099,515 B2    8/2006    Lin et al.
(Continued)

FOREIGN PATENT DOCUMENTS

EP    2086239 A2    8/2009
EP    2154898 A2    2/2010
(Continued)

OTHER PUBLICATIONS

"Transform Skip Mode"Joint Collaborative Team on Video Coding (JCT-VC) of ITU-T SG 16 WP3 and ISO/IEC JTC1/SC29/WG11 6th Meeting: Torino, IT, Jul. 14-22, 2011 Mrak et al.*

(Continued)

*Primary Examiner* — Nathnael Aynalem
(74) *Attorney, Agent, or Firm* — IP Legal Services, LLC

(57) ABSTRACT

A method for decoding an image, according to the present invention, comprises the steps of: receiving image information that corresponds to a block to be decoded; performing entropy-decoding with respect to the image information that is received; deciding a transform skip mode of the block to be decoded from a plurality of transform skip mode candidates, based on the image information that is entropy-decoded; and reverse-transforming the block to be decoded based on the transform skip mode that is decided.

10 Claims, 11 Drawing Sheets

(51) Int. Cl.
| | |
|---|---|
| H04N 19/46 | (2014.01) |
| H04N 19/122 | (2014.01) |
| H04N 19/61 | (2014.01) |
| H04N 19/11 | (2014.01) |
| H04N 19/12 | (2014.01) |
| H04N 19/186 | (2014.01) |
| H04N 19/124 | (2014.01) |
| H04N 19/513 | (2014.01) |
| H04N 19/60 | (2014.01) |
| H04N 19/147 | (2014.01) |

(52) U.S. Cl.
CPC .......... *H04N 19/124* (2014.11); *H04N 19/186* (2014.11); *H04N 19/46* (2014.11); *H04N 19/513* (2014.11); *H04N 19/60* (2014.11); *H04N 19/61* (2014.11); *H04N 19/147* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 7,162,093 B2 | 1/2007 | Regunathan et al. |
| 7,317,839 B2 | 1/2008 | Holcomb |
| 7,352,905 B2 | 4/2008 | Mukerjee et al. |
| 7,369,709 B2 | 5/2008 | Hsu et al. |
| 7,412,102 B2 | 8/2008 | Srinivasan et al. |
| 7,469,011 B2 | 12/2008 | Lin et al. |
| 7,529,302 B2 | 5/2009 | Mukerjee et al. |
| 7,567,617 B2 | 7/2009 | Holcomb |
| 7,577,198 B2 | 8/2009 | Holcomb |
| 7,577,200 B2 | 8/2009 | Holcomb et al. |
| 7,590,179 B2 | 9/2009 | Mukerjee |
| 7,599,438 B2 | 10/2009 | Holcomb et al. |
| 7,606,308 B2 | 10/2009 | Holcomb et al. |
| 7,606,311 B2 | 10/2009 | Hsu et al. |
| 7,609,762 B2 | 10/2009 | Crinon et al. |
| 7,616,692 B2 | 11/2009 | Holcomb et al. |
| 7,620,106 B2 | 11/2009 | Holcomb et al. |
| 7,623,574 B2 | 11/2009 | Holcomb |
| 7,630,438 B2 | 12/2009 | Mukerjee et al. |
| 7,664,177 B2 | 2/2010 | Mukerjee |
| 7,680,185 B2 | 3/2010 | Mukerjee et al. |
| 7,688,894 B2 | 3/2010 | Liang et al. |
| 7,724,827 B2 | 5/2010 | Liang et al. |
| 7,782,954 B2 | 8/2010 | Liang et al. |
| 7,822,123 B2 | 10/2010 | Lin et al. |
| 7,839,930 B2 | 11/2010 | Holcomb et al. |
| 7,852,919 B2 | 12/2010 | Crinon et al. |
| 7,852,936 B2 | 12/2010 | Mukerjee et al. |
| 7,924,920 B2 | 4/2011 | Lin et al. |
| 7,924,921 B2 | 4/2011 | Crinon et al. |
| 7,961,786 B2 | 6/2011 | Holcomb |
| 8,005,137 B2 | 8/2011 | Han et al. |
| 8,009,739 B2 | 8/2011 | Holcomb et al. |
| 8,014,450 B2 | 9/2011 | Regunathan et al. |
| 8,064,520 B2 | 11/2011 | Mukerjee et al. |
| 8,085,844 B2 | 12/2011 | Holcomb et al. |
| 8,107,531 B2 | 1/2012 | Regunathan et al. |
| 8,116,380 B2 | 2/2012 | Regunathan et al. |
| 8,213,779 B2 | 7/2012 | Crinon |
| 8,345,754 B2 | 1/2013 | Ribas-Corbera et al. |
| 8,396,123 B2 | 3/2013 | Han et al. |
| 8,488,668 B2 | 7/2013 | Ye et al. |
| 8,582,659 B2 | 11/2013 | Crinon |
| 8,625,669 B2 | 1/2014 | Holcomb |
| 8,625,670 B2 | 1/2014 | Lee et al. |
| 8,625,680 B2 | 1/2014 | Srinivasan et al. |
| 8,687,709 B2 | 4/2014 | Hsu et al. |
| 8,711,950 B2 | 4/2014 | Minamoto |
| 8,885,714 B2 | 11/2014 | Budagavi et al. |
| 2003/0016755 A1* | 1/2003 | Tahara et al. ............ 375/240.25 |
| 2005/0052294 A1 | 3/2005 | Liang et al. |
| 2005/0053146 A1 | 3/2005 | Mukerjee |
| 2006/0104521 A1 | 5/2006 | Teng |
| 2007/0133891 A1* | 6/2007 | Jeong ............................ 382/238 |
| 2008/0137738 A1* | 6/2008 | Fernandes ................ 375/240.03 |
| 2009/0097571 A1* | 4/2009 | Yamada et al. .......... 375/240.25 |
| 2009/0207911 A1 | 8/2009 | Minamoto |
| 2009/0232217 A1 | 9/2009 | Lee et al. |
| 2009/0238271 A1* | 9/2009 | Kim et al. ................ 375/240.12 |
| 2010/0054334 A1* | 3/2010 | Yoo ...................... H04N 19/176 375/240.14 |
| 2010/0195715 A1* | 8/2010 | Liu et al. .................. 375/240.02 |
| 2011/0090952 A1* | 4/2011 | Cohen .................. H04N 19/176 375/240.2 |
| 2011/0090954 A1* | 4/2011 | Cohen et al. ............ 375/240.03 |
| 2011/0090967 A1 | 4/2011 | Chen et al. |
| 2011/0268183 A1* | 11/2011 | Sole et al. ................ 375/240.03 |
| 2012/0281928 A1* | 11/2012 | Cohen ...................... G06T 9/40 382/240 |

FOREIGN PATENT DOCUMENTS

| | | |
|---|---|---|
| JP | 2007-516640 A | 6/2007 |
| JP | 2009-194617 A | 8/2009 |
| KR | 10-2009-0099234 A | 9/2009 |
| KR | 10-2009-0129939 A | 12/2009 |
| RU | 2341035 C1 | 12/2008 |
| WO | 2008/035842 A1 | 3/2008 |

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E603.
Marta Mrak et al., "Transform skip mode", Document: JCTVC-F077_r1, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-9.
Marta Mrak et al., "Transform skip mode", BBC R&D, BBC MMXI, pp. 1-7.

* cited by examiner

910

920

930

METHOD AND APPARATUS FOR ENCODING/DECODING IMAGE

CROSS REFERENCE TO PRIOR APPLICATIONS

The present application is a Continuation of pending U.S. patent application Ser. No. 14/353,288 (filed on Apr. 21, 2014), which is a National Stage Patent Application of PCT International Patent Application No. PCT/KR2012/008482 (filed on Oct. 17, 2012) under 35 U.S.C. §371, which claims priority to Korean Patent Application No. 10-2011-0106107 (filed on Oct. 17, 2011), the teachings of which are incorporated herein in their entireties by reference.

BACKGROUND

The present invention relates to image processing, and more particularly, to a transform method and a transform apparatus.

Recently, demands for high-resolution and high-quality videos, such as high-definition (HD) and ultrahigh-definition (UHD) videos, are increasing.

To provide videos with higher resolution and higher quality, the amount of video data increases. Accordingly, costs of transferring and storing video data rise so as to provide high-quality videos as compared with conventional video data processing methods. In order to solve these problems occurring with an increase in resolution and quality of video data, high-efficiency video compression techniques may be utilized.

As video data compression technology, various schemes are used such as inter prediction that is dependent on data elements of pictures other than the current picture, intra prediction that is derived from only data elements of the same decoded slice, and entropy encoding/decoding of allocating shorter codes to frequently occurring or appearing signals.

SUMMARY

An aspect of the present invention is to provide a video encoding method and a video encoding apparatus which are capable of increasing video encoding performance.

Another aspect of the present invention is to provide a video decoding method and a video decoding apparatus which are capable of increasing video decoding performance.

Still another aspect of the present invention is to provide a transform method and a transform apparatus which are capable of increasing video encoding performance.

Yet another aspect of the present invention is to provide an inverse transform method and an inverse transform apparatus which are capable of increasing video decoding performance.

Yet another aspect of the present invention is to provide a scanning method and a scanning apparatus which are capable of increasing video encoding performance.

Yet another aspect of the present invention is to provide an inverse scanning method and an inverse scanning apparatus which are capable of increasing video decoding performance.

An embodiment of the present invention provides a video decoding method. The method may include receiving information on a picture corresponding to a decoding target block, entropy-decoding the information on the picture, determining a transform skip mode (TSM) for the decoding target block among a plurality of TSM candidates based on the entropy-decoded information on the picture, and inverse-transforming the decoding target block based on the determined TSM. Here, the TSM candidates may include at least one of a 2-directional (2D) transform mode of performing both horizontal transform and vertical transform, a horizontal transform mode of performing horizontal transform, a vertical transform mode of performing vertical transform and a non-transform mode of not performing transform.

The information on the picture may include information on a prediction mode corresponding to the decoding target block and a type of a prediction unit (PU) corresponding to the decoding target block.

When the prediction mode corresponding to the decoding target block is an inter mode and the type of the PU corresponding to the decoding target block is N×2N, N being a natural number, the vertical transform mode may be allocated a shorter codeword than the horizontal transform mode.

When the prediction mode corresponding to the decoding target block is an inter mode and the type of the PU corresponding to the decoding target block is 2N×N, N being a natural number, the TSM candidates may include the 2D transform mode, the horizontal transform mode and the non-transform mode except for the vertical transform mode.

When the prediction mode corresponding to the decoding target block is an inter mode and the type of the PU corresponding to the decoding target block is N×2N, N being a natural number, the TSM candidates may include the 2D transform mode, the vertical transform mode and the non-transform mode except for the horizontal transform mode.

When the prediction mode corresponding to the decoding target block is a short distance intra prediction (SDIP) mode and the type of the PU corresponding to the decoding target block is 2N×(1/2)N, N being a natural number that is 2 or greater, the TSM candidates may include the 2D transform mode, the horizontal transform mode and the non-transform mode except for the vertical transform mode.

When the prediction mode corresponding to the decoding target block is an SDIP mode and the type of the PU corresponding to the decoding target block is (1/2)N×2N, N being natural number that is 2 or greater, the TSM candidates may include the 2D transform mode, the vertical transform mode and the non-transform mode except for the horizontal transform mode.

The information on the picture may include information on a prediction mode corresponding to the decoding target block and a prediction direction of a PU corresponding to the decoding target block.

When the prediction mode corresponding to the decoding target block is an intra mode and the prediction direction of the PU corresponding to the decoding target block is a vertical direction, the vertical transform mode may be allocated a shorter codeword than the horizontal transform mode.

The video decoding method may further include determining a scanning mode for the decoding target block based on the determined TSM, and inverse-scanning the decoding target block based on the determined scanning mode.

The determining of the scanning mode may determine a vertical scanning mode as the scanning mode when the determined TSM is the horizontal transform mode.

The determining of the scanning mode may determine a horizontal scanning mode as the scanning mode when the determined TSM is the vertical transform mode.

Another embodiment of the present invention provides a video decoding apparatus. The apparatus may include an entropy decoding module to receive information on a picture corresponding to a decoding target block and to entropy-decode the information on the picture, and an inverse transform module to determine a TSM for the decoding target block among a plurality of TSM candidates based on the entropy-decoded information on the picture and to inverse-transform the decoding target block based on the determined TSM. Here, the TSM candidates comprise at least one of a 2D transform mode of performing both horizontal transform and vertical transform, a horizontal transform mode of performing horizontal transform, a vertical transform mode of performing vertical transform and a non-transform mode of not performing transform.

Still another embodiment of the present invention provides a video encoding method. The method may include generating a residual block corresponding to an encoding target block, determining a TSM for the encoding target block among a plurality of TSM candidates; and transforming the residual block based on the determined TSM. Here, the TSM candidates may include at least one of a 2D transform mode of performing both horizontal transform and vertical transform, a horizontal transform mode of performing horizontal transform, a vertical transform mode of performing vertical transform and a non-transform mode of not performing transform.

A prediction mode corresponding to the encoding target block may be an inter mode, and the determining of the TSM may determine the TSM based on a type of a PU corresponding to the encoding target block.

A prediction mode corresponding to the encoding target block may be an SDIP mode, and the determining of the TSM may determine the TSM based on a type of a PU corresponding to the encoding target block.

A prediction mode corresponding to the encoding target block may be an intra mode, and the determining of the TSM may determine the TSM based on intra prediction mode direction of a PU corresponding to the encoding target block.

The video encoding method may further include determining a scanning mode for the encoding target block based on the determined TSM, and scanning the encoding target block based on the determined scanning mode.

Yet another embodiment of the present invention provides a video encoding apparatus. The apparatus may include a residual block generating module to generate a residual block corresponding to an encoding target block, and a transform module to determine a TSM for the encoding target block among a plurality of TSM candidates and to transform the residual block based on the determined TSM. Here, the TSM candidates may include at least one of a 2D transform mode of performing both horizontal transform and vertical transform, a horizontal transform mode of performing horizontal transform, a vertical transform mode of performing vertical transform and a non-transform mode of not performing transform.

According to a video encoding method of the present invention, video encoding performance may be enhanced.

According to a video decoding method of the present invention, video decoding performance may be enhanced.

According to a transform/inverse transform method of the present invention, video encoding/decoding performance may be enhanced.

According to a scanning/inverse scanning method of the present invention, video encoding/decoding performance may be enhanced.

DETAILED DESCRIPTION OF EMBODIMENTS

Figure 1:
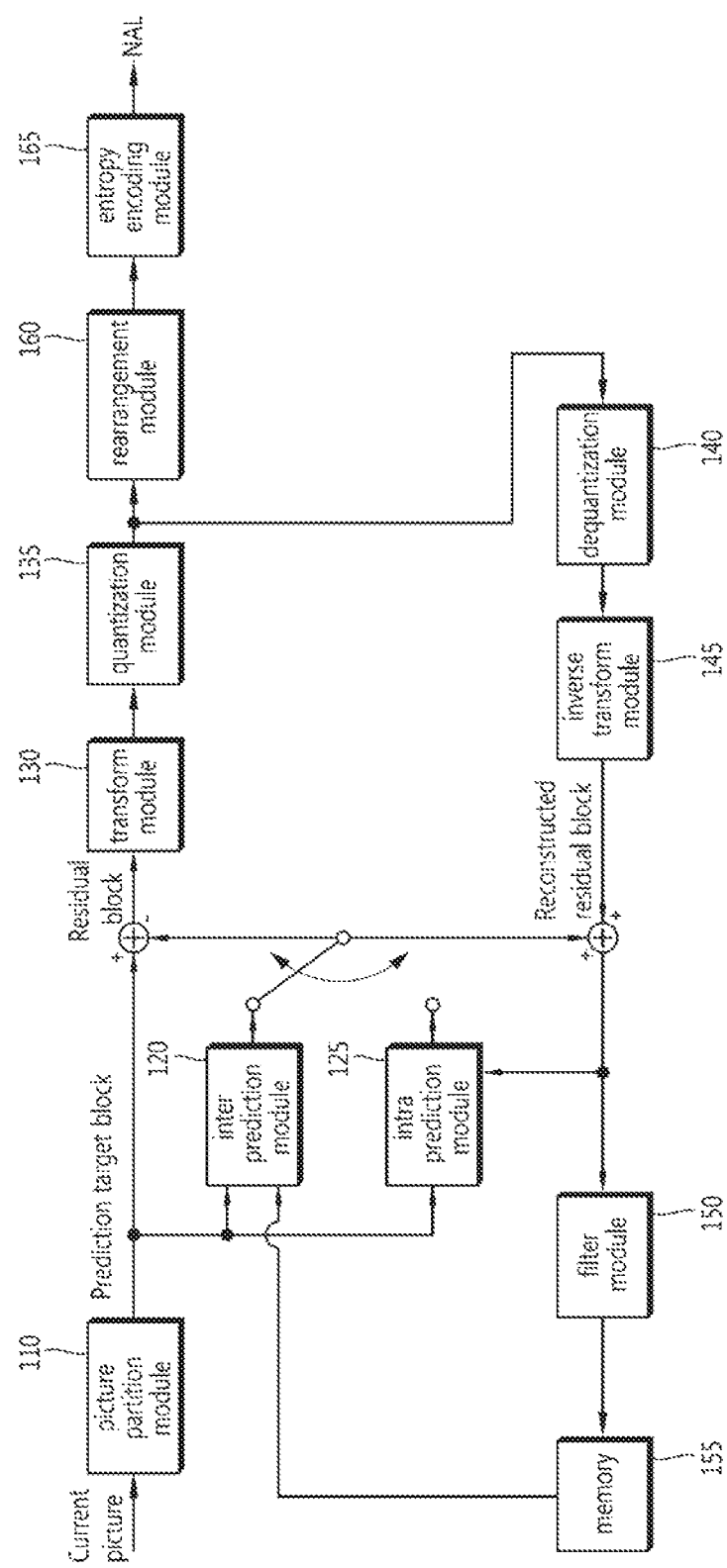
FIG. 1 is a block diagram illustrating a configuration of a video encoding apparatus according to an exemplary embodiment of the present invention.

Although elements illustrated in the drawings are independently shown so as to represent different distinctive functions in a video encoding apparatus/decoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a configuration of a video encoding apparatus according to an exemplary embodiment of the present invention. Referring to FIG. 1, the video encoding apparatus may include a picture partitioning module 110, an inter prediction module 120, an intra prediction module 125, a transform module 130, a quantization module 135, a dequantization module 140, an inverse transform module 145, a module filter 150, a memory 155, a rearrangement module 160 and an entropy encoding module 165.

The picture partitioning module 110 may divide an input picture into one or more coding units. A coding unit (CU) is a unit of encoding conducted by the video encoding apparatus and may be recursively subdivided with depth information based on a quadtree structure. A CU may have different sizes of 8×8, 16×16, 32×32 and 64×64. A CU with a maximum size is referred to as a largest coding unit (LCU), and a CU with a minimum size as a smallest coding unit (SCU).

The picture partitioning module 110 may divide a CU to generate a prediction unit (PU) and a transform unit (TU). A PU may be smaller than or the same as a CU, and may not necessarily be a square block but be a rectangular block.

Generally, intra prediction may be performed by 2N*2N or N*N blocks. Here, N is a natural number, representing a number of pixels, and 2N*2N or N*N may represent a PU size (and/or partition mode). However, in short distance intra prediction (SDIP), not only a 2N*2N PU but a subdivided PU with a size of hN*2N/2N*hN (here, h=1/2) may be also used to increase efficiency in intra prediction. When an hN*2N/2N*hN PU is used, directivity of a boundary in a block may be further reflected, and accordingly energy of a prediction error signal may be decreased to reduce bit numbers needed for encoding, thereby increasing encoding efficiency.

Inter prediction may be performed by 2N*2N, 2N*N, N*2N or N*N blocks. Here, N is a natural number, representing a number of pixels, and 2N*2N, 2N*N, N*2N or N*N may represent a PU size (and/or partition mode). Further, inter prediction may be performed by 2N×nU, 2N×nD, nL×2N or nR×2N PUs, in addition to the 2N*2N, 2N*N, N*2N or N*N PUs, in order to enhance efficiency in inter prediction. Here, 2N×nU, 2N×nD, nL×2N or nR×2N may represent a PU size (and/or partition mode). In 2N×nU and 2N×nD partition modes, a PU may have a size of 2N×(1/2)N or 2N×(3/2)N, while in nL×2N and nR×2N partition modes, a PU may have a size of (1/2)N×2N or (3/2)N×2N.

In an inter prediction mode, the inter prediction module 120 may perform motion estimation (ME) and motion compensation (MC). The inter prediction module 120 may generate a prediction block based on information on at least one of previous and subsequent pictures of the current picture.

The inter prediction module 120 may perform motion estimation based on a divided prediction target block and at least one reference block stored in the memory 155. The inter prediction module 120 may generate motion information including a motion vector (MV), a reference block index and a prediction mode as a result of motion estimation.

Further, the inter prediction module 120 may perform motion compensation using the motion information and the reference block. Here, the inter prediction module 120 may generate and output a prediction block corresponding an input block from the reference block.

In an intra prediction mode, the intra prediction module 125 may generate a prediction block based on information on a pixel in the current picture. In the intra prediction mode, the intra prediction module 125 may perform prediction for a current block based on a prediction target block and a reconstructed block previously reconstructed via transformation and quantization. Here, the reconstructed block may be a reconstructed picture that has not been subjected to the filter module 150.

In the inter prediction mode or intra prediction mode described above, prediction may be performed on a prediction target block to generate a prediction block. Here, a residual block may be generated by differentiation between the prediction target block and the generated prediction block.

The transform module 130 may transform a residual block by a TU to generate a transform coefficient. A TU may have a tree structure within maximum and minimum sizes. It may be indicated through a flag whether a current block is partitioned into sub-blocks by each TU. The transform module 130 may perform transform based on a discrete cosine transform (DCT) and/or discrete sine transform (DST).

The quantization module 135 may quantize values transformed by the transform module 130. A quantization coefficient may change based on a block or importance of a picture. The quantized transform coefficient may be provided to the rearrangement module 160 and the dequantization module 140.

The rearrangement module 160 may arrange a two-dimensional (2D) block of the quantized transform coefficients into a one-dimensional (1D) vector of transform coefficients by scanning so as to enhance efficiency in entropy encoding. The rearrangement module 160 may change scanning order based on stochastic statistics to enhance entropy encoding efficiency.

The entropy encoding module 165 may entropy-encode the values obtained by the rearrangement module 160. In entropy encoding, a more frequently occurring syntax element value may be allocated a codeword of smaller bit numbers, while a less frequently occurring syntax element value may be allocated a codeword of more bit numbers. Thus, a size of a bit string for symbols to be encoded may be reduced to enhance video encoding compression performance. Various encoding methods, such as exponential Golomb coding, context-adaptive variable length coding (CAVLC) and/or context-adaptive binary arithmetic coding (CABAC), may be used for entropy encoding. The encoded information may be formed into a compressed bitstream and be transferred or stored through a network abstraction layer (NAL).

The dequantization module 140 may dequantize the transform coefficients quantized by the quantization module 135, and the inverse transform module 145 may generate a reconstructed residual block to inverse-transform the dequantized transform coefficients. The reconstructed residual block may be merged with the prediction block generated by the inter prediction module 120 or the intra prediction module 125 to generate a reconstructed block. The reconstructed block may be provided to the intra prediction module 125 and the filter module 150.

The filter module 150 may filter the reconstructed residual block using a deblocking filter, a sample adaptive offset (SAO) and/or an adaptive loop filter (ALF). The deblocking filter may filter the reconstructed block so as to remove a distortion on boundaries between blocks occurring in encoding and decoding. The SAO is a loop filtering process to be performed on the residual block via the deblocking filter to reconstruct an offset difference from an original picture by a pixel. A band offset and an edge offset may be used as the SAO. The band offset may divide a pixel into 32 bands according to intensity and apply offsets to two divided groups of 16 bands on an edge area and 16 bands in a central area. The ALF may perform filtering so as to minimize an error between the prediction target block and the finally reconstructed block. The ALF may perform filtering based on a value obtained by comparing the reconstructed block filtered by the deblocking filter with the current prediction target block, and filter coefficient information on the ALF may be loaded onto a slice header and transferred from the encoding apparatus to the decoding apparatus.

The memory 155 may store the finally reconstructed block via the filter module 150, and the finally reconstructed block may be provided to the inter prediction module 120 performing inter prediction.

Figure 2:
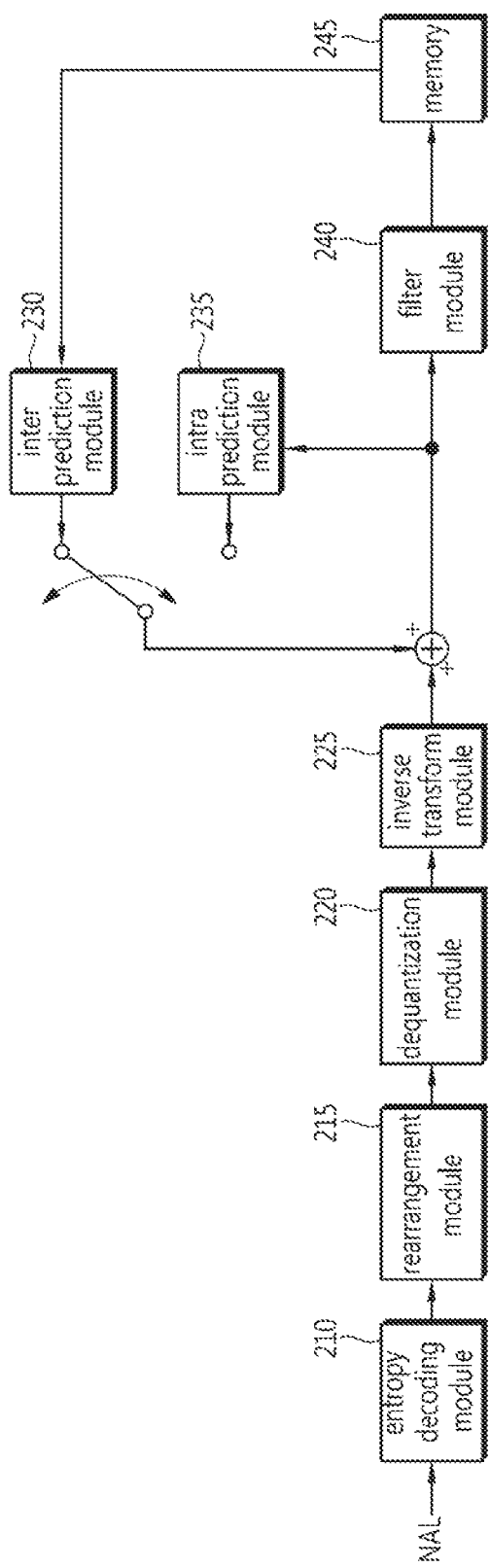
FIG. 2 is a block diagram illustrating a configuration of a video decoding apparatus according to an exemplary embodiment of the present invention.

FIG. 2 is a block diagram illustrating a configuration of a video decoding apparatus according to an exemplary embodiment of the present invention. Referring to FIG. 2, the video decoding apparatus may include an entropy decoding module 210, a rearrangement module 215, a dequantization module 220, an inverse transform module 225, an inter prediction module 230, an intra prediction module 235, a filter module 240 and a memory 245.

The entropy decoding module 210 may receive a compressed bitstream from an NAL. The entropy decoding module 210 may entropy-decode the received bitstream, and also entropy-decode a prediction mode and motion vector information if the bitstream includes the prediction mode and the motion vector information. When entropy decoding is used, a more frequently occurring syntax element value may be allocated a codeword of smaller bit numbers, while a less frequently occurring syntax element value may be allocated a codeword of more bit numbers. Thus, a size of a bit string for symbols to be encoded may be reduced to enhance video encoding compression performance.

An entropy-decoded transform coefficient or residual signal may be provided to the rearrangement module 215. The rearrangement module 215 may inverse-scan the decoded transform coefficient or residual signal to generate a 2D block of transform coefficients.

The dequantization module 220 may dequantize the rearranged transform coefficients. The inverse transform module 225 may inverse-transform the dequantized transform coefficients to generate a residual block.

The residual block may be merged with a prediction block generated by the inter prediction module 230 or intra prediction module 235 to generate a reconstructed block. The reconstructed block may be provided to the intra prediction module 235 and the filter module 240. The inter prediction module 230 and the intra prediction module 235 performs operations the same as or equivalent to those of the inter prediction module 120 and the intra prediction module 125 of the video encoding apparatus, and thus descriptions thereof will be omitted herein.

The filter module 240 may filter the reconstructed block using a deblocking filter, an SAO and/or an ALF. The deblocking filter may filter the reconstructed block to remove a distortion on a boundary between blocks that occurs in encoding and decoding. The SAO may be applied to the reconstructed block filtered by the deblocking filter by a pixel to reduce a difference from an original picture. The ALF may filter the reconstructed block via the SAO so as to minimize an error between the prediction target block and the finally reconstructed block.

The memory 245 may store the finally reconstructed block obtained through the filter module 240, and the stored reconstructed block may be provided to the inter prediction module 230 performing inter prediction.

Hereinafter, a block may refer to a video encoding and decoding unit. Thus, in this description, a block may mean a CU, PU, TU and the like. Also, a encoding/decoding target block may collectively include a transform/inverse transform target block, if transform/inverse transform is conducted; a prediction target block, if prediction is conducted; and the like.

As described above with reference to FIGS. 1 and 2, the encoding apparatus may perform transform on a residual block by a TU, and the decoding apparatus may inverse-transform dequantized transform coefficients to generate a reconstructed residual block. In the following description, inverse-transform may be also termed "transform" for convenience as necessary, which will be easily understood by a person having ordinary knowledge in the art.

The encoding apparatus and the decoding apparatus may perform 2-directional (2D) transform including vertical transform and horizontal transform. However, when vertical and horizontal signals have remarkably different characteristics, vertical transform or horizontal transform may be omitted. Also, the entire transform process may be omitted for a sparse signal. Such transform methods may reduce complexity in the decoding apparatus and improve encoding efficiency.

Hereinafter, a transform mode involving both horizontal transform and vertical transform is referred to as a "2D transform mode." A transform mode involving horizontal transform only without vertical transform is referred to as a "horizontal transform mode," and a transform mode involving vertical transform only without horizontal transform is referred to as a "vertical transform mode." Further, a transform mode involving neither horizontal transform nor vertical transform is referred to as a "non-transform mode." Here, the non-transform mode may be also referred to as a "transform bypass mode."

Figure 3:
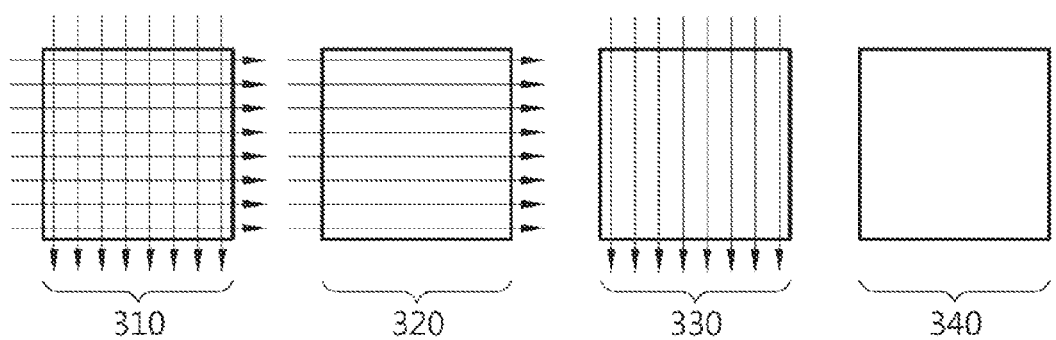
FIG. 3 schematically illustrates a transform method based on a transform mode according to an exemplary embodiment of the present invention.

FIG. 3 schematically illustrates a transform method based on a transform mode according to an exemplary embodiment of the present invention.

Square blocks 310 to 340 shown in FIG. 3 are transform target blocks. Here, the transform target blocks may be TUs and/or CUs. Also, arrows marked on the blocks 310 to 330 may indicate transform directions.

A transform target block 310 may be subjected to both vertical transform and horizontal transform. Thus, a transform mode for the block 310 may correspond to the 2D transform mode. A transform target block 320 may be subjected to horizontal transform only without vertical transform. Thus, a transform mode for the block 320 may correspond to the horizontal transform mode. In this case, since transform is performed on rows, not on columns, a transform method in the horizontal transform mode may be also referred to as "transform on rows only." A transform target block 330 may be subjected to vertical transform only without horizontal transform. Thus, a transform mode for the block 330 corresponds to the vertical transform mode. In this case, since transform is performed on columns, not on rows, a transform method in the vertical transform mode may be also referred to as "transform on columns only." A transform target block 340 may not be subjected to transform. Thus, a transform mode for the block 340 is the non-transform mode.

In the foregoing transform modes, vertical transform and/or horizontal transform may be or may not be omitted. Thus, these transform modes may be also referred to as a transform skip mode (TSM). That is, the transform skip mode may include the 2D transform mode, the horizontal transform mode, the vertical transform mode and the non-transform mode. The 2D transform mode, the horizontal transform mode, the vertical transform mode and/or the non-transform mode may be used as candidates for the transform skip mode for a transform target block.

In one exemplary embodiment, at least one of the 2D transform mode, the horizontal transform mode, the vertical transform mode and the non-transform mode may be used as a transform skip mode candidate for a transform target block. Here, one transform skip mode selected from a plurality of transform skip mode candidates may be applied to one transform target block. The encoding apparatus may select a transform skip mode having a smallest cost value in view of rate-distortion optimization (RDO) among the transform skip mode candidates. Here, the encoding apparatus may transform the transform target block based on the selected transform skip mode. That is, the encoding apparatus may apply one selected transform skip mode of the 2D transform mode, the horizontal transform mode, the vertical transform mode and/or the non-transform mode to the transform target block.

In addition, the encoding apparatus may encode information on the selected transform skip mode and transmit the information to the decoding apparatus. The transform skip mode may be determined by a CU or TU. Here, when the transform skip mode is determined by a CU, the information may be transmitted by a CU. When the transform skip mode is determined by a TU, the information may be transmitted by a TU.

For instance, the information on the transform skip mode may be transmitted to the decoding apparatus through a transform skip mode index. The transform skip mode index may be an index indicating the transform skip mode to be applied to the transform target block among the transform skip mode candidates. The transform skip mode index may be allocated an index value based on the transform skip mode. Here, the 2D transform mode, the horizontal transform mode and the vertical transform mode may correspond different index values.

The decoding apparatus may decode the information about the transform skip mode (for example, the encoded transform skip mode index) which is received from encoding apparatus. Here, the decoding apparatus may derive the transform skip mode to be applied to the transform target block based on the decoded information. The decoding apparatus may transform the transform target block according to the derived transform skip mode. That is, the decoding apparatus may apply one derived transform skip mode of the 2D transform mode, the horizontal transform mode, the vertical transform mode and/or the non-transform mode to the transform target block.

Figure 4:
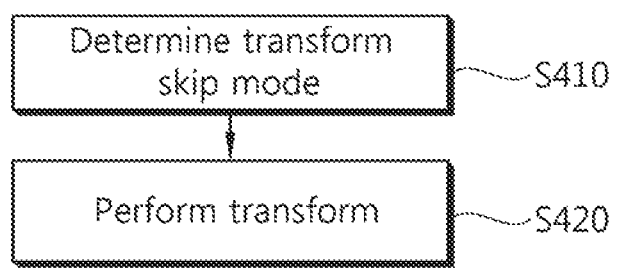
FIG. 4 is a flowchart schematically illustrating a transform process of the encoding apparatus according to an exemplary embodiment of the present invention.

FIG. 4 is a flowchart schematically illustrating a transform process of the encoding apparatus according to an exemplary embodiment of the present invention.

Referring to FIG. 4, the encoding apparatus may determine a transform skip mode for a transform target block among a plurality of transform skip mode candidates (S410). Here, the transform skip mode candidates may include at least one of the 2D transform mode, the horizontal transform mode, the vertical transform mode and the non-transform mode. Here, the encoding apparatus may select a transform skip mode having a smallest cost value in view of RDO among the transform skip mode candidates. A method of determining a transform skip mode candidate according to an exemplary embodiment will be described in detail.

Referring back to FIG. 4, the encoding apparatus may transform the transform target block according to the determined transform skip mode (S420). That is, the encoding apparatus may apply one selected transform skip mode among the 2D transform mode, the horizontal transform mode, the vertical transform mode and the non-transform mode to the transform target block.

Further, the encoding apparatus may encode information on the transform skip mode applied to the transform target block and transmit the information to the decoding apparatus. For example, the information may be transmitted to the decoding apparatus through a transform skip mode index. Here, as described above, considering probabilities of transform skip modes, the encoding apparatus may allocate a short codeword to a more likely transform skip mode and a long codeword to a less likely transform skip mode. A method of allocating a codeword for a transform skip mode according to an exemplary embodiment will be described in detail.

Figure 5:
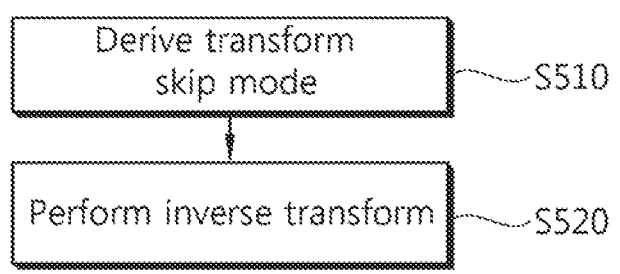
FIG. 5 is a flowchart schematically illustrating an inverse transform process of the decoding apparatus according to an exemplary embodiment of the present invention.

FIG. 5 is a flowchart schematically illustrating an inverse transform process of the decoding apparatus according to an exemplary embodiment of the present invention.

The decoding apparatus may decode a bitstream including the information about the transform skip mode (for example, the encoded transform skip mode index) which is received from encoding apparatus. In the bitstream received from the encoding apparatus, a short codeword may be allocated to a more likely transform skip mode, and a long codeword may be allocated to a less likely transform skip mode. A method of allocating a codeword for a transform skip mode according to an exemplary embodiment will be described in detail.

Referring to FIG. 5, the decoding apparatus may derive a transform skip mode for an inverse transform target block among a plurality of transform skip mode candidates (S510). Here, the transform skip mode candidates may include at least one of the 2D transform mode, the horizontal transform mode, the vertical transform mode and the non-transform mode. The decoding apparatus may use the same transform skip mode candidate as used in the encoding apparatus. Here, the decoding apparatus may derive the transform skip mode for the inverse transform target block based on the decoded information (the information on the transform skip mode, for example, the decoded transform skip mode index). A method of determining a transform skip mode candidate according to an exemplary embodiment will be described in detail.

Referring back to FIG. 5, the decoding apparatus may inverse-transform the inverse transform target block according to the derived transform skip mode (S520). That is, the decoding apparatus may apply one selected transform skip mode of the 2D transform mode, the horizontal transform mode, the vertical transform mode and/or the non-transform mode to the inverse transform target block.

Meanwhile, in the embodiments illustrated in FIGS. 4 and 5, the encoding apparatus and the decoding apparatus may use all of the 2D transform mode, the horizontal transform mode, the vertical transform mode and/or the non-transform mode as transform skip mode candidates. Here, the 2D transform mode (and/or a transform skip mode index corresponding to the 2D transform mode), the horizontal transform mode (and/or a transform skip mode index corresponding to the horizontal transform mode), the vertical transform mode (and/or a transform skip mode index corresponding to the vertical transform mode) and/or the non-transform mode (and/or a transform skip mode index corresponding to the non-transform mode) may be allocated different codewords respectively. In this case, as described above, the encoding apparatus may allocate a short codeword to a more likely transform skip mode and a long codeword to a less likely transform skip mode considering probabilities of transform skip modes. Table 1 illustrates a method of allocating a codeword for a transform skip mode according to an exemplary embodiment.

TABLE 1

| TSM | Row transformation | Column transformation | Codeword (CABAC and/or CAVLC) | Note |
|---|---|---|---|---|
| TS0 | O | O | 1 | 2D transform |
| TS1 | O | — | 01 | 1D transform |
| TS2 | — | O | 001 | 1D transform |
| TS3 | — | — | 000 | Non-transform |

In Table 1, TS0 represents the 2D transform mode. TS1 represents the horizontal transform mode, and TS2 represents the vertical transform mode. TS3 represents the non-transform mode. Here, both the horizontal transform mode and the vertical transform mode may correspond to a 1D transform mode.

For example, referring to Table 1, if the 2D transform mode most frequently happens, the 2D transform mode may be allocated a codeword "1." Likewise, according to frequency, the horizontal transform mode may be allocated a codeword "01," the vertical transform mode a codeword "001," and the non-transform mode a codeword "000."

Even when vertical transform and/or horizontal transform is omitted depending on transform skip modes, the same quantization matrix may be applied as in the 2D transform mode. In this case, the encoding apparatus and the decoding apparatus may perform scaling on values in rows and/or columns not subjected to transform, which may be represented by Equation 1.

$$y=(x*\text{scale}+\text{offset})>>\text{shift} \quad [\text{Equation 1}]$$

Here, x may be an element in a non-transformed row and/or column, and y may be a scaled value. "scale" may be a scaling factor. "offset" may be an offset value applied in scaling, and "shift" may be a bit shifting value applied in scaling. Here, "offset" and "shift" may have the same values as an offset value and a bit transfer value applied when transform is not omitted, for example, in the 2D transform mode.

Further, in Equation 1, the scaling factor applied to the encoding apparatus and the decoding apparatus may be determined depending on a TU size. In one exemplary embodiment, the scaling factor according to the TU size may be set as listed in Table 2.

TABLE 2

| N | 4 | 8 | 16 | 32 |
|---|---|---|---|---|
| Scale | 128 | 181 | 256 | 362 |

Here, N (and/or N×N) may be a TU size, and scale may be a scaling factor. Referring to FIG. 2, when a TU has an 8×8 size, a scaling factor value of 181 may be applied.

As mentioned above, a PU may not necessarily have a square shape but have a rectangular shape. For example, in the inter mode, a PU may have a 2N*N, N*2N, 2N×nU, 2N×nD, nL×2N or nR×2N size (and/or shape). In SDIP, a PU may have a 2N*(1/2)N or (1/2)N*2N size (and/or shape). In this instance, since a particular transform skip mode may be less likely to happen, the encoding apparatus and the decoding apparatus may not use the less likely transform skip mode as a transform skip mode candidate, thereby enhancing encoding/decoding performance. Alternatively, the encoding apparatus may allocate a short codeword to the less likely transform skip mode, thereby enhancing encoding/decoding performance. Accordingly, a method of determining a transform skip mode candidate and a method of allocating a codeword for a transform skip mode according to a PU size (and/or form) may be provided.

Figure 6:
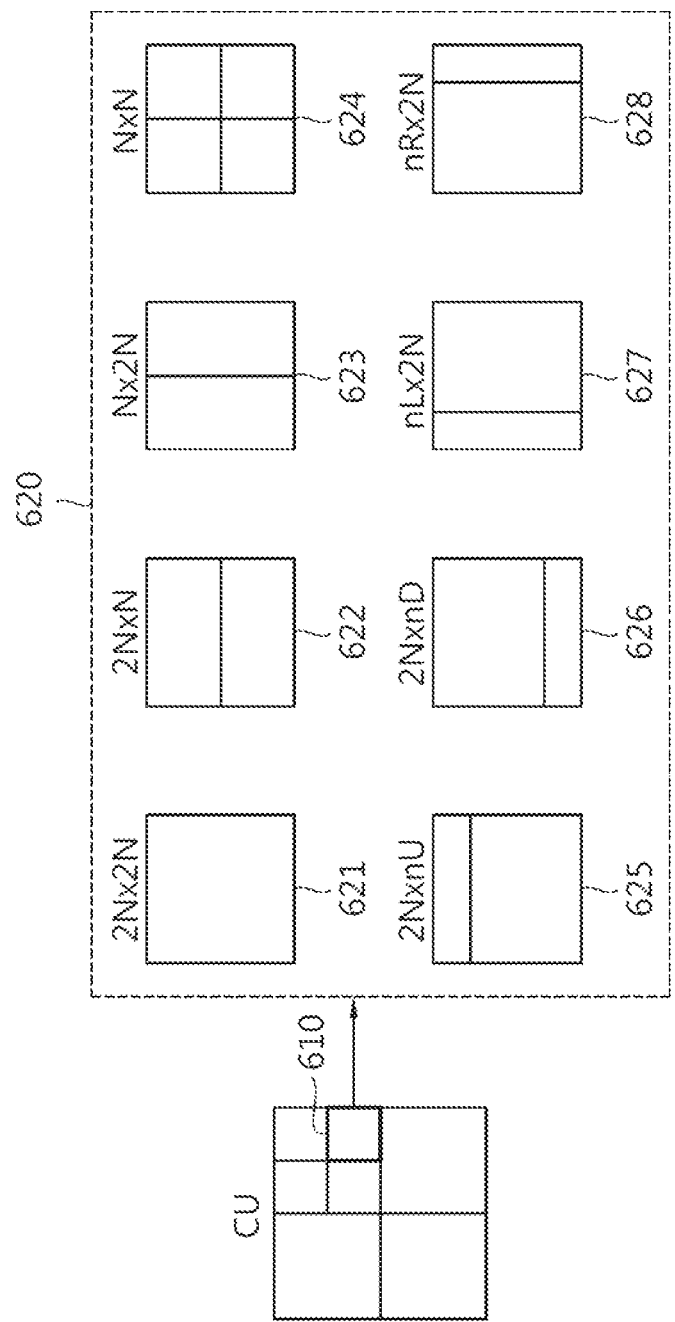
FIG. 6 illustrates a method of determining a transform skip mode candidate and a method of allocating a codeword to a transform skip mode according to a PU form in an inter mode.

FIG. 6 illustrates a method of determining a transform skip mode candidate and a method of allocating a codeword to a transform skip mode according to a PU form in the inter mode.

FIG. 6 schematically shows a PU size (and/or form) in the inter mode. Referring to FIG. 6, one CU 610 may be divided into different sizes of PUs according to properties of a picture and the like. FIG. 6 shows that one CU 610 are divided into a plurality of PUs 620 in inter prediction. In the inter mode, the PUs may have sizes (and/or forms) of 2N*2N 621, 2N*N 622, N*2N 623, N*N 624, 2N×nU 625, 2N×nD 626, nL×2N 627 or nR×2N 628. Here, a PU with an N*N 624 size (and/or form) may be used only for an SCU as a minimum CU so as to prevent redundant computations for calculating prediction costs.

Meanwhile, in the inter mode, probabilities of the horizontal transform mode and the vertical transform mode may vary on PU forms. Thus, different codewords may be allocated to transform skip modes (and/or transform skip mode indexes) depending on PU forms. That is, codewords allocated to transform skip modes (and/or transform skip mode indexes) may be determined based on PU forms.

In one exemplary embodiment, when a PU has a form of N*2N 623, energy compaction effect of horizontal transform may be smaller than energy compaction effect of vertical transform. Thus, the vertical transform mode may have a higher probability than the horizontal transform mode. In Table 1, the horizontal transform mode is allocated the codeword "01" and the vertical transform mode is allocated the codeword "001," that is, a more likely transform skip mode is allocated a longer codeword. Thus, in the PU with the form of N*2N 623, the codeword for the horizontal transform mode and the codeword for the vertical transform mode are reset, thereby enhancing encoding performance. Table 3 illustrates a method of allocating codewords to transform skip modes in the PU with the form of N*2N 623 according to an exemplary embodiment.

TABLE 3

| TSM | Row transformation | Column transformation | Codeword (CABAC and/or CAVLC) | Note |
|---|---|---|---|---|
| TS0 | O | O | 1 | 2D transform |
| TS1 | O | — | 001 | 1D transform |
| TS2 | — | O | 01 | 1D transform |
| TS3 | — | — | 000 | Non-transform |

In Table 3, TS0 represents the 2D transform mode. TS1 represents the horizontal transform mode, and TS2 represents the vertical transform mode. TS3 represents the non-transform mode. Here, both the horizontal transform mode and the vertical transform mode may correspond to a 1D transform mode.

Referring to Table 3, the horizontal transform mode may be allocated a codeword "001," and the vertical transform mode may be allocated a codeword "01." As described above, in the PU with the form of N*2N 623, the vertical transform mode may have a higher probability than the horizontal transform mode, and thus the vertical transform mode may be allocated a shorter code than the horizontal transform mode.

Although Table 3 is described based on the PU with the form of N*2N 623, the present invention is not limited thereto. For example, in a PU with a form of nL×2N 627 or nR×2N 628 in addition to N*2N 623, the vertical transform mode may also have a higher probability than the horizontal transform mode. Accordingly, the vertical transform mode may be allocated a shorter code than the horizontal transform mode.

On the other hand, in PUs with 2N*N 622, 2N×nU 625 and 2N×nD 626 forms, the horizontal transform mode may have a higher probability than the vertical transform mode. Accordingly, the horizontal transform mode may be allocated a shorter code than the vertical transform mode. For example, in the PU with the 2N*N 622, 2N×nU 625 and 2N×nD 626 forms, the same codeword allocation method as in Table 1 may be used.

Meanwhile, as described above, since probabilities of the horizontal transform mode and the vertical transform mode in the inter mode may vary on PU forms, a number of transform skip mode candidates may be determined differently based on PU forms. That is, transform skip mode candidates for a transform target block may be determined based on a PU form corresponding to the transform target block.

In one exemplary embodiment, when a PU has a 2N*N 622 form, energy compaction effect of vertical transform may be smaller than energy compaction effect of horizontal transform, and thus the vertical transform mode may have a lower probability than the horizontal transform mode. Thus, in the PU with the 2N*N 622 form, the 2D transform mode, the horizontal transform mode and the non-transform mode may be used as transform skip mode candidates for a transform target block, excluding the vertical transform mode. In this case, one transfer skip mode among the 2D transform mode, the horizontal transform mode and the non-transform mode may be applied to the transform target block. Table 4 illustrates a method of allocating codewords to transform skip modes when the 2D transform mode, the horizontal transform mode and the non-transform mode are used as transform skip mode candidates according to an exemplary embodiment.

TABLE 4

| TSM | Row transformation | Column transformation | Codeword (CABAC and/or CAVLC) | Note |
|---|---|---|---|---|
| TS0 | O | O | 0 | 2D transform |
| TS1 | O | — | 10 | 1D transform |
| TS3 | — | — | 11 | Non-transform |

In Table 4, TS0 represents the 2D transform mode, TS1 represents the horizontal transform mode, and TS3 represents the non-transform mode. Here, the horizontal transform mode may correspond to a 1D transform mode. Referring to Table 4, in the PU with the 2N*N 622 form, the 2D transform mode, the horizontal transform mode and the non-transform mode may be used as transform skip mode candidates.

Although Table 4 is described based on the PU with the form of 2N*N 622, the present invention is not limited thereto. For example, in PUs with forms of 2N×nU 625 and 2N×nD 626 in addition to 2N*N 622, the vertical transform mode may also have a lower probability than the horizontal transform mode. Accordingly, the 2D transform mode, the horizontal transform mode and the non-transform mode may be used as transform skip mode candidates for a transform target block, excluding the vertical transform mode.

Alternatively, in the PU with the form of N*2N 623, since energy compaction effect of horizontal transform may be smaller than energy compaction effect of vertical transform, the horizontal transform mode may have a lower probability than the vertical transform mode. Thus, in the PU with the form of N*2N 623, the 2D transform mode, the vertical transform mode and the non-transform mode may be used as transform skip mode candidates for a transform target block, excluding the horizontal transform mode. In this case, one transform skip mode among the 2D transform mode, the vertical transform mode and the non-transform mode may be applied to the transform target block. Table 5 illustrates a method of allocating codewords to transform skip modes when the 2D transform mode, the vertical transform mode and the non-transform mode are used as transform skip mode candidates according to an exemplary embodiment.

TABLE 5

| TSM | Row transformation | Column transformation | Codeword (CABAC and/or CAVLC) | Note |
|---|---|---|---|---|
| TS0 | O | O | 0 | 2D transform |
| TS2 | — | O | 10 | 1D transform |
| TS3 | — | — | 11 | Non-transform |

In Table 5, TS0 represents the 2D transform mode, TS2 represents the vertical transform mode, and TS3 represents the non-transform mode. Here, the vertical transform mode may correspond to a 1D transform mode. Referring to Table 5, in the PU with the form of N*2N 623, the 2D transform mode, the vertical transform mode and the non-transform mode may be used as transform skip mode candidates.

Although Table 5 is described based on the PU with the form of N*2N 623, the present invention is not limited thereto. For example, in a PU with a form of nL×2N 627 or nR×2N 628 in addition to N*2N 623, the horizontal transform mode may also have a lower probability than the vertical transform mode. Accordingly, the 2D transform mode, the vertical transform mode and the non-transform mode may be also used as transform skip mode candidates for a transform target block, excluding the horizontal transform mode.

In the foregoing embodiments illustrated in Tables 3 to 5, bit numbers used for encoding transform skip modes (and/or transform skip mode indexes) may be reduced. Accordingly, encoding/decoding performance may be enhanced.

Figure 7:
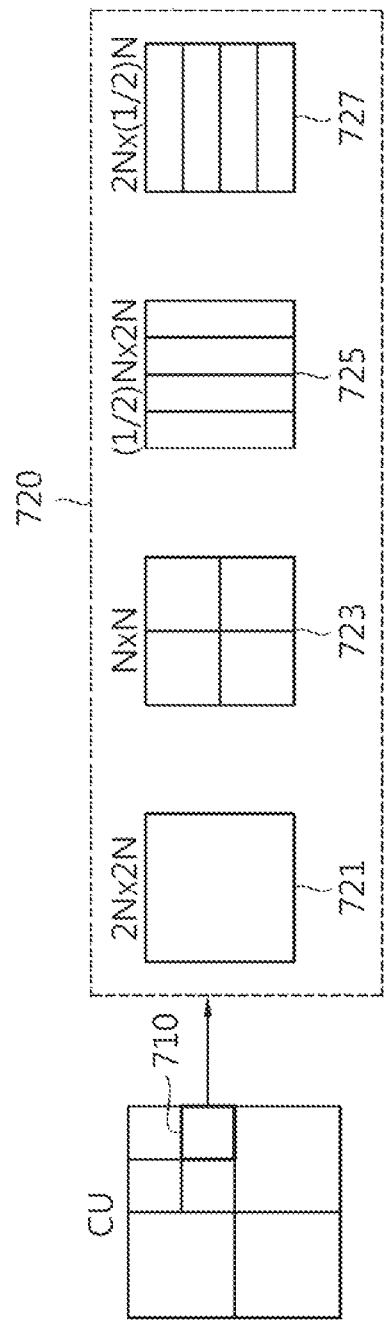
FIG. 7 illustrates a method of determining a transform skip mode candidate and a method of allocating a codeword to a transform skip mode according to a PU form in SDIP.

FIG. 7 illustrates a method of determining a transform skip mode candidate and a method of allocating a codeword to a transform skip mode according to a PU form in SDIP.

FIG. 7 schematically shows a PU size (and/or form) in SDIP. Referring to FIG. 7, one CU 710 may be divided into different sizes of PUs according to properties of a picture and the like. FIG. 7 shows that one CU 710 are divided into a plurality of PUs 720 in SDIP. In SDIP, the PUs may have sizes (and/or forms) of 2N*2N 721, N*N 723, (1/2)N*2N 725 or 2N*(1/2)N 727. Here, a PU with an N*N 723 size (and/or form) may be used only for an SCU as a minimum CU so as to prevent redundant computations for calculating prediction costs.

In SDIP, since probabilities of the horizontal transform mode and the vertical transform mode may vary on PU forms, a number of transform skip mode candidates may be determined differently based on PU forms. That is, transform skip mode candidates for a transform target block may be determined based on a PU form corresponding to the transform target block.

In one exemplary embodiment, when a PU has a 2N*(1/2)N 727 form, energy compaction effect of vertical transform may be smaller than energy compaction effect of horizontal transform, and thus the vertical transform mode may have a lower probability than the horizontal transform mode. Thus, in the PU with the 2N*(1/2)N 727 form, the 2D transform mode, the horizontal transform mode and the non-transform mode may be used as transform skip mode candidates for a transform target block, excluding the vertical transform mode. In this case, one transfer skip mode among the 2D transform mode, the horizontal transform mode and the non-transform mode may be applied to the transform target block. A method of allocating codewords to transform skip modes when the 2D transform mode, the horizontal transform mode and the non-transform mode are used as transform skip mode candidates has been described above in Table 4, and thus a description thereof will be omitted herein.

Alternatively, in a PU with a form of (1/2)N*2N 725, since energy compaction effect of horizontal transform may be smaller than energy compaction effect of vertical transform, the horizontal transform mode may have a lower probability than the vertical transform mode. Thus, in the PU with the form of (1/2)N*2N 725, the 2D transform mode, the vertical transform mode and the non-transform mode may be used as transform skip mode candidates for a transform target block, excluding the horizontal transform mode. In this case, one transform skip mode among the 2D transform mode, the vertical transform mode and the non-transform mode may be applied to the transform target block. A method of allocating codewords to transform skip modes when the 2D transform mode, the vertical transform mode and the non-transform mode are used as transform skip mode candidates has been described above in Table 5, and thus a description thereof will be omitted herein.

In the foregoing embodiments, bit numbers used for encoding transform skip modes (and/or transform skip mode indexes) may be reduced. According to, encoding/decoding performance may be enhanced.

Figure 8:
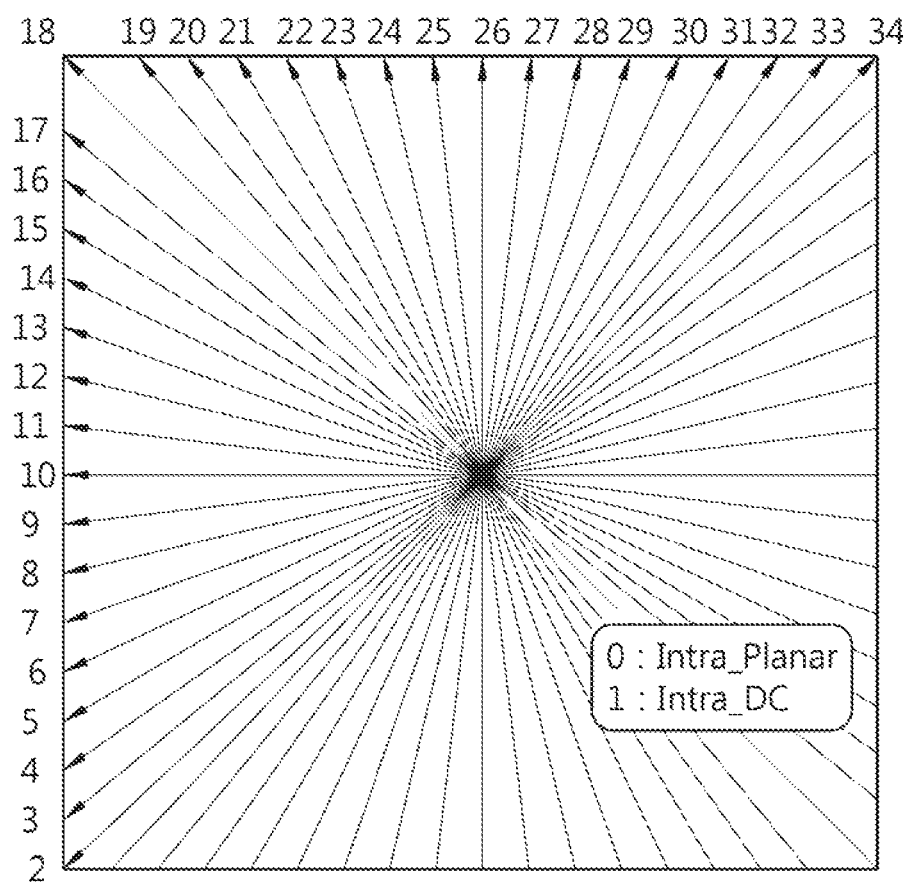
FIG. 8 illustrates a method of allocating a codeword to a transform skip mode according to intra prediction mode directions.

FIG. 8 illustrates a method of allocating a codeword to a transform skip mode according to a prediction direction in the intra mode.

As described above with reference to FIGS. 1 and 2, the encoding apparatus and the decoding apparatus may generate a prediction block by performing intra prediction based on information on a pixel within a current picture. Intra prediction may be performed according to an intra prediction mode for a prediction target block. The intra prediction mode may include a DC mode, a planar mode, a vertical mode, a horizontal mode and an angular mode. The DC mode and the planar mode are non-directional modes, and the other modes are directional modes. Here, the angular mode may be a directional prediction mode other than the vertical mode and the horizontal mode.

FIG. 8 illustrates a prediction direction of an intra prediction mode and a mode value allocated to each prediction direction. In FIG. 8, each intra prediction mode have different prediction direction. Numbers allocated to each intra prediction modes may be referred to as mode values.

Referring to FIG. 8, an intra prediction mode with a mode value of 0 may be referred to as a planar mode. In the planar mode, reference pixels used for prediction of a pixel value of a prediction target pixel may be determined based on a location of the prediction target pixel in a prediction target block. A prediction value of the prediction target pixel may be derived based on the determine reference pixels. An intra prediction mode with a mode value of 1 may be referred to as a DC mode, in which a prediction block may be generated using an average pixel value of pixels neighboring to the prediction target block. In an intra prediction mode with a mode value of 26, prediction may be performed in the vertical direction based on pixels values of neighboring blocks. Thus, the intra prediction mode with the mode value of 26 may be also referred to as the vertical mode. In an intra prediction mode with a mode value of 10 (horizontal mode, prediction may be performed in the horizontal direction based on pixels values of neighboring blocks. Thus, the intra prediction mode with the mode value of 10 may be also referred to as the horizontal mode. In the other modes, prediction may be performed based on pixel values of neighboring blocks according to corresponding angles.

Probabilities of the horizontal transform mode and the vertical transform mode may vary on an intra prediction mode (and/or prediction direction) of a PU corresponding to a transform target block. Thus, a different codeword may be allocated to a transform skip mode (and/or transform skip mode index) based on the intra prediction mode (and/or prediction direction) of the PU. That is, a codeword allocated to a transform skip mode (and/or transform skip mode index) may be determined based on the intra prediction mode (and/or prediction direction) of the PU corresponding to the transform target block.

In one exemplary embodiment, when the intra prediction mode of the PU is the vertical mode, energy compaction effect of horizontal transform may be smaller than energy compaction effect of vertical transform. Thus, in this case, the vertical transform mode may have a higher probability than the horizontal transform mode. In the embodiment illustrated with reference to Table 1, the horizontal transform mode is allocated the codeword "01" and the vertical transform mode is allocated the codeword "001," that is, a more likely transform skip mode is allocated a longer codeword. Thus, when the intra prediction mode of the PU is the vertical mode, the codeword for the horizontal transform mode and the codeword for the vertical transform mode are reset, thereby enhancing encoding performance. That is, when the intra prediction mode of the PU is the vertical mode, the vertical transform mode may have a higher probability than the horizontal transform mode, the vertical transform mode may be allocated a shorter code than the horizontal transform mode. An embodiment of allocating a shorter codeword to the vertical transform mode than to the horizontal transform mode is similar to the embodiment illustrated in Table 3, and thus a description thereof is omitted herein.

Alternatively, when the intra prediction mode of the PU corresponding to the transform target block is the horizontal mode, the horizontal transform mode may have a higher probability than the vertical transform mode. Thus, in this case, the horizontal transform mode may be allocated a shorter code than the vertical transform mode. For example, when the intra prediction mode of the PU corresponding to the transform target block is the horizontal mode, the same codeword allocation method as in Table 1 may be used.

Figure 9:
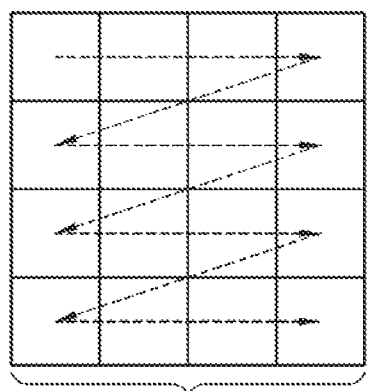
FIG. 9 schematically illustrates a method of scanning a transform coefficient based on a transform skip mode according to an exemplary embodiment of the present invention.
Figure 9:
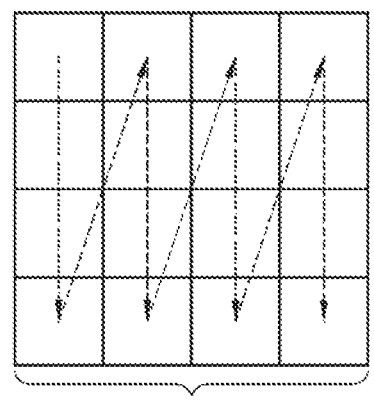
Figure 9:
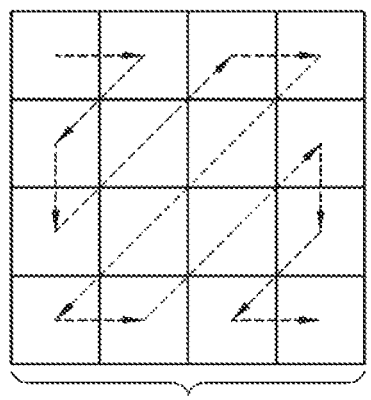

FIG. 9 schematically illustrates a method of scanning a transform coefficient based on a transform skip mode according to an exemplary embodiment of the present invention.

FIG. 9 shows horizontal scanning 910, vertical scanning 920 and zigzag scanning 930 according to an exemplary embodiment. Although FIG. 9 illustrates a scanning method (and/or scanning order) for a 4×4 block only, such a method may be applied regardless of block sizes, without being limited thereto.

In the embodiment of FIG. 9, inverse scanning may be also termed "scanning" for convenience of description as necessary, which will be easily understood by a person having ordinary knowledge in the art.

As described above in FIG. 1, the encoding apparatus may perform scanning to arrange a two-dimensional (2D) block of quantized transform coefficients into a one-dimensional (1D) vector of transform coefficients so as to enhance efficiency in entropy encoding. Also, as described above in FIG. 2, the decoding apparatus may generate a 2D block of transform coefficients by scanning a 1D vector of decoded transformed coefficients.

Here, the encoding apparatus and the decoding apparatus may determine a scanning method (and/or scanning order) based on a transform skip mode. That is, according to exemplary embodiments of the present invention, different scanning methods (and/or scanning orders) may be used based on a transform skip mode for a transform target block.

In one exemplary embodiment, when the transform skip mode is the horizontal transform mode, residual signals are more likely to remain in the vertical direction. Thus, when the transform skip mode for the transform target block is the horizontal transform mode, vertical scanning 920 may be used for the transform target block. When the transform skip mode is the vertical transform mode, residual signal are more likely to remain in the horizontal direction. Thus, when the transform skip mode for the transform target block is the vertical transform mode, horizontal scanning 910 may be used for the transform target block. In transform skip modes other than the horizontal transform mode and the vertical transform mode, zigzag scanning 930 may be used to perform scanning.

Figure 10:
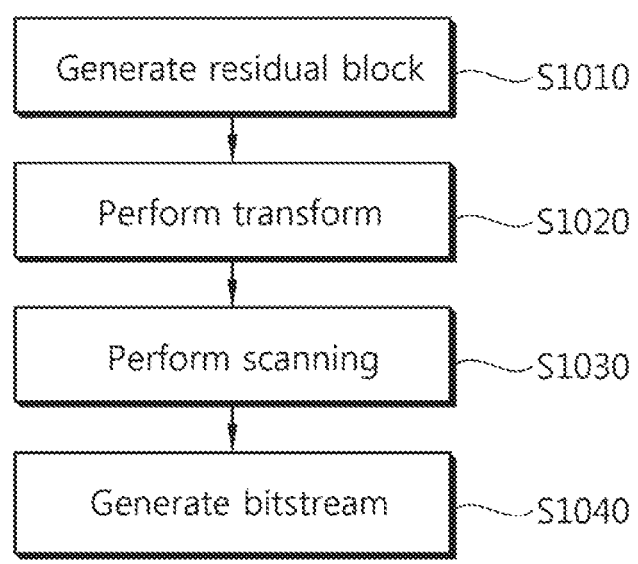
FIG. 10 is a flowchart schematically illustrating an encoding method according to an exemplary embodiment of the present invention.

FIG. 10 is a flowchart schematically illustrating an encoding method according to an exemplary embodiment of the present invention.

Referring to FIG. 10, the encoding apparatus may generate a residual block corresponding to a current block (S1010). As described above, the encoding apparatus may perform inter prediction and/or intra prediction on the current block, thereby generating a prediction block corresponding to the current block. Here, the encoding apparatus may generate a residual signal, that is, the residual block, by differentiating by a pixel between a pixel value of the current block and a pixel value of the prediction block.

In FIG. 10, the encoding apparatus may transform the residual signal, that is, the residual block (S1020). The encoding apparatus may transcode the residual signal by applying a transformation kernel, and a transcoding kernel may have a 2*2, 4*4, 8*8, 16*16, 32*32 or 64*64 size. In one exemplary embodiment, a transform coefficient C for an n*n block may be calculated by Equation 2.

$$C(n,n)=T(n,n)\times B(n,n)\times T(n,n)^T \qquad \text{[Equation 2]}$$

Here, C(n,n) is an n*n transform coefficient matrix, T(n,n) is an n*n transformation kernel matrix, and B(n,n) is an n*n matrix of a residual block.

When a transform coefficient is generated via transformation, the encoding apparatus may quantize the generated transform coefficient.

It may be determined through RDO which is transmitted among the residual block and the transform coefficient. When prediction is properly done, the residual block, that is, the residual signal, may be transmitted without transcoding. The encoding apparatus may compare cost functions before/after transcoding and select a method involving minimum costs. Here, the encoding apparatus may transmit information on a type of a signal (residual signal or transform coefficient) transmitted with respect to the current block to the decoding apparatus.

Transform processes have been illustrated in the foregoing embodiments, and thus descriptions thereof are omitted herein.

Referring back to FIG. 10, the encoding apparatus may scan the transform coefficient (S1030). Here, as described above, the encoding apparatus may determine a scanning method (and/or scanning order) based on a transform skip mode. A method of determining a scanning order based on a transform skip mode has been described above, and thus a description thereof is omitted herein.

When scanning is performed, the encoding apparatus may entropy-encode the scanned transform coefficient and side information (for example, information on an inter prediction mode of the current block) (S1040). The encoded information may be formed into a compressed bitstream and be transferred or stored through an NAL.

Although the encoding method is described with a series of stages based on the flowchart in FIG. 10, the present invention is not limited thereto. Some stages of FIG. 10 may be carried out in different order from described above or in parallel. Further, additional stages may be included between stages in the flowchart, or one or more stages may be deleted from the flowchart of FIG. 10 within the scope of the present invention.

Figure 11:
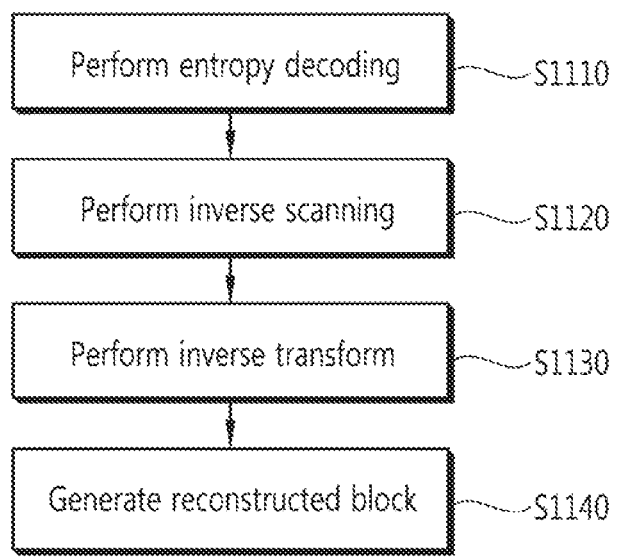
FIG. 11 is a flowchart schematically illustrating a decoding method according to an exemplary embodiment of the present invention.

FIG. 11 is a flowchart schematically illustrating a decoding method according to an exemplary embodiment of the present invention.

Referring to FIG. 11, the decoding apparatus may entropy-decode a bitstream received from the encoding apparatus (S1110). For instance, the decoding apparatus may derive a prediction mode and a residual signal of a current block based on a variable length coding (VLC) table and/or CABAC. The decoding apparatus may obtain information on whether a signal received with respect to the current block is the residual signal or a transform coefficient and obtain the residual signal or a 1D vector of transform coefficients for the current block. When the received bitstream includes side information needed for decoding, both the bitstream and the side information may be entropy-decoded.

In FIG. 11, the decoding apparatus may inverse-scan the entropy-decoded residual signal or transform coefficients to generate a 2D block (S1120). Here, a residual block may be generated in the case of the residual signal, and a 2D block of transform coefficients may be generated in the case of the transform coefficients. When the transform coefficients are generated, the decoding apparatus may dequantize the generated transform coefficients.

As described above, in inverse scanning, the decoding apparatus may determine a scanning method (and/or scanning order) based on a transform skip mode. A method of determining a scanning order based on a transform skip mode has been described above, and thus a description thereof is omitted herein.

Referring back to FIG. 11, the decoding apparatus may inverse-transform the dequantized transform coefficients, thereby generating a residual block (S1130). Inverse transformation may be represented by Equation 3.

$$B(n,n)=T(n,n)\times C(n,n)\times T(n,n)^T \qquad \text{[Equation 3]}$$

Inverse transformation has been described above, and thus a description thereof is omitted herein.

When the residual block is generated, the decoding apparatus may generate a reconstructed block based on the generated residual block (S1140). As described above, the decoding apparatus may perform inter prediction and/or intra prediction on a decoding target block to generate a prediction block corresponding to the decoding target block. Here, the decoding apparatus may merge a pixel value of the prediction block and a pixel value of the residual block by a pixel, thereby generating the reconstructed block.

Although the decoding method is described with a series of stages based on the flowchart in FIG. 11, the present invention is not limited thereto. Some stages of FIG. 11 may be carried out in different order from described above or in parallel. Further, additional stages may be included between stages in the flowchart, or one or more stages may be deleted from the flowchart of FIG. 11 within the scope of the present invention.

Although methods have been described with a series of stages or blocks based on the flowcharts in the aforementioned embodiments, the present invention is not limited to the foregoing sequence of the stages. Some stages may be carried out in different order from described above or parallel at the same time. Also, it will be understood by those skilled in the art that the stages illustrated in the flowcharts are not exclusive, additional stages may be included in the flowchart, or one or more stages may be deleted from the flowcharts without affecting the scope of the present invention.

The present invention has been described with reference to the exemplary embodiments, and the foregoing embodiments include various aspects of examples. Although all possible combinations may not be mentioned to illustrate various aspects, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A method of decoding a video signal having a current block to be decoded with a decoding apparatus, comprising:
    obtaining residual coefficients relating to the current block from the video signal;
    obtaining inverse-quantized residual coefficients by inverse-quantizing the residual coefficients;
    determining, based on a transform skip mode index specifying a transform skip mode of the current block, the transform skip mode of the current block,
    wherein the transform skip mode of the current block is determined to be one of one or more transform skip mode candidates,
    wherein the one or more transform skip mode candidates include at least one of a 2D transform mode, a horizontal transform mode, a vertical transform mode or a non-transform mode, and
    wherein a number of the one or more transform skip mode candidates is different according to a size or a shape of the current block;
    obtaining, based on the determined transform skip mode of the current block, residual samples from the inverse-quantized residual coefficients;
    obtaining prediction samples of the current block by using motion information of the current block; and
    reconstructing the current block by using the residual samples and the prediction samples,
    wherein when the transform skip mode of the current block is determined to be the non-transform mode, the residual samples are obtained by scaling the inverse-quantized residual coefficients in non-transformed rows and/or columns of the current block with a predetermined value.

2. The method of claim 1, wherein the scaling is performed using a bit shift operation.

3. The method of claim 1, wherein the transform skip mode index is transmitted, from an encoding apparatus, by a transform unit.

4. The method of claim 1, wherein the 2D transform mode performs both a horizontal transform and a vertical transform, the horizontal transform mode performs the horizontal transform only without the vertical transform, the vertical transform mode performs the vertical transform only without the horizontal transform, and the non-transform mode performs none of the horizontal transform and the vertical transform.

5. The method of claim 1, wherein the motion information includes a motion vector and a reference index.

6. An apparatus of decoding a video signal having a current block to be decoded, comprising:
    a decoding apparatus configured to:
        obtain residual coefficients relating to the current block from the video signal;
        obtain inverse-quantized residual coefficients by inverse-quantizing the residual coefficients;
        determine, based on a transform skip mode index specifying a transform skip mode of the current block, the transform skip mode of the current block,
        wherein the transform skip mode of the current block is determined to be one of one or more transform skip mode candidates,
        wherein the one or more transform skip mode candidates including at least one of a 2D transform mode, a horizontal transform mode, a vertical transform mode or a non-transform mode, and
        wherein a number of the one or more transform skip mode candidates is different according to a size or a shape of the current block;
        obtain, based on the determined transform skip mode of the current block, residual samples from the inverse-quantized residual coefficients;
        obtain prediction samples of the current block by using motion information of the current block; and
        reconstruct the current block by using the residual samples and the prediction samples,
        wherein when the transform skip mode of the current block is determined to be the non-transform mode, the residual samples are obtained by scaling the inverse-quantized residual coefficients in non-transformed rows and/or columns of the current block with a predetermined value.

7. The apparatus of claim 6, wherein the scaling is performed using a bit shift operation.

8. The apparatus of claim 6, wherein the transform skip mode index is transmitted, from an encoding apparatus, by a transform unit.

9. The apparatus of claim 6, wherein the 2D transform mode performs both a horizontal transform and a vertical transform, the horizontal transform mode performs the horizontal transform only without the vertical transform, the vertical transform mode performs the vertical transform only without the horizontal transform, and the non-transform mode performs none of the horizontal transform and the vertical transform.

10. The apparatus of claim 6, wherein the motion information includes a motion vector and a reference index.

* * * * *